US012774715B2

(12) United States Patent
Fiegener et al.

(10) Patent No.: US 12,774,715 B2
(45) Date of Patent: Oct. 27, 2026

(54) SUCTION CUP WITH POTTING MATERIAL

(71) Applicant: ALLEN GLOBAL FZCO, Dubai (AE)

(72) Inventors: John D. Fiegener, Marblehead, MA (US); Jolie S. Bercow, Marblehead, MA (US)

(73) Assignee: ALLEN GLOBAL FZCO, Dubai (AE)

( * ) Notice: Subject to any disclaimer, the term of this patent is extended or adjusted under 35 U.S.C. 154(b) by 123 days.

(21) Appl. No.: 19/047,038

(22) Filed: Feb. 6, 2025

(65) Prior Publication Data

US 2026/0226938 A1 Aug. 6, 2026

(51) Int. Cl.
*F16B 47/00* (2006.01)
*G01L 19/08* (2006.01)

(52) U.S. Cl.
CPC ............ *F16B 47/00* (2013.01); *G01L 19/086* (2013.01)

(58) Field of Classification Search
CPC ....... F16B 47/00; F16B 47/003; F16M 13/02; F16M 13/022; B25J 15/06; B25J 15/0616; B25J 15/0683; B60R 2011/0056; B60R 2011/0068
See application file for complete search history.

(56) References Cited

U.S. PATENT DOCUMENTS 1,723,238 A 8/1929 Hoot
2,009,721 A 7/1935 Williams
2,247,128 A 6/1941 Levey
3,752,375 A 8/1973 Weigl
3,918,669 A 11/1975 Osterhout
(Continued)

FOREIGN PATENT DOCUMENTS

CN 202728393 U 2/2013
CN 105857198 A 8/2016
(Continued)

OTHER PUBLICATIONS

International Search Report and Written Opinion of the International Searching Authority mailed Apr. 30, 2026 for International Patent Application No. PCT/IB2026/050755, 15 pages.
(Continued)

*Primary Examiner* — Jonathan P Masinick
(74) *Attorney, Agent, or Firm* — Pierce Atwood LLP

(57) ABSTRACT

A suction cup is provided which is configured to be selectively secured to an object. The suction cup may include a suction cup housing defining a suction chamber, a vacuum pump configured to adjust the pressure within the suction chamber to selectively secure the suction cup to an object, and a pressure sensor positioned within the suction cup housing to detect suction chamber pressure information. The suction cup may also include at least one electrical line coupled to the pressure sensor to transmit suction chamber pressure information to a location outside of the suction cup, and a potting material positioned in at least a portion of the suction cup housing to prevent pressure loss within the suction chamber. The suction cup may be in combination with a carrier device for securing an accessory to a vehicle, where the suction cup is configured to be selectively secured to a vehicle. Methods of assembling a suction cup configured to be selectively secured to an object are also provided.

16 Claims, 9 Drawing Sheets

(56) References Cited

U.S. PATENT DOCUMENTS

| | | | | | |
|---|---|---|---|---|---|
| 4,403,716 | A | | 9/1983 | Carlson et al. | |
| 5,169,042 | A | | 12/1992 | Ching | |
| 5,184,858 | A | | 2/1993 | Arai | |
| 5,270,540 | A | * | 12/1993 | Skop, Jr. ................. | G01J 3/506 348/E17.005 |
| 5,292,045 | A | | 3/1994 | Mandel | |
| 5,795,001 | A | | 8/1998 | Burke | |
| 6,371,343 | B1 | | 4/2002 | D'Souza | |
| 6,523,731 | B1 | | 2/2003 | Pedrini | |
| 7,673,914 | B2 | | 3/2010 | Liao | |
| 8,814,113 | B1 | | 8/2014 | Chen | |
| 9,530,340 | B2 | * | 12/2016 | Lee ........................ | G09G 3/006 |
| 9,688,213 | B2 | | 6/2017 | Lisle | |
| 9,821,721 | B2 | | 11/2017 | Casagrande | |
| 10,030,690 | B2 | | 7/2018 | Liu | |
| 10,267,453 | B2 | | 4/2019 | Casagrande | |
| 10,610,070 | B2 | * | 4/2020 | Lv .......................... | G05B 23/02 |
| 10,619,630 | B2 | * | 4/2020 | Livingston, Jr. ........ | F04B 37/14 |
| 10,723,276 | B2 | | 7/2020 | Casagrande | |
| 11,648,881 | B2 | | 5/2023 | Polster et al. | |
| 11,648,883 | B1 | | 5/2023 | Buttermore | |
| 11,680,600 | B2 | * | 6/2023 | Nair ....................... | A43B 13/14 248/205.9 |
| 11,878,658 | B2 | | 1/2024 | Polster et al. | |
| 11,926,288 | B1 | | 3/2024 | Buttermore | |
| 12,115,659 | B1 | | 10/2024 | Nguyen | |
| 12,213,589 | B2 | | 2/2025 | Zuo | |
| 2006/0065686 | A1 | | 3/2006 | Furtado | |
| 2006/0272758 | A1 | | 12/2006 | Yin et al. | |
| 2007/0164065 | A1 | | 7/2007 | Davis | |
| 2014/0076949 | A1 | | 3/2014 | Casagrande | |
| 2014/0326237 | A1 | | 11/2014 | Seiver | |
| 2015/0060378 | A1 | | 3/2015 | Bestor | |
| 2016/0068111 | A1 | | 3/2016 | Walker et al. | |
| 2018/0072235 | A1 | | 3/2018 | Casagrande | |
| 2018/0251076 | A1 | | 9/2018 | Casagrande | |
| 2019/0063488 | A1 | | 2/2019 | Becker | |
| 2019/0162363 | A1 | | 5/2019 | Koch | |
| 2019/0242521 | A1 | | 8/2019 | Casagrande | |
| 2020/0269768 | A1 | | 8/2020 | Jarrard | |
| 2023/0071906 | A1 | | 3/2023 | Polster et al. | |
| 2023/0234515 | A1 | | 7/2023 | Polster et al. | |
| 2024/0034246 | A1 | * | 2/2024 | Aggarwal ............... | B60R 11/02 |

FOREIGN PATENT DOCUMENTS

| | | | | | |
|---|---|---|---|---|---|
| CN | 212581316 | U | | 2/2021 | |
| CN | 222497467 | U | | 2/2025 | |
| DE | 202006015591 | U1 | | 12/2006 | |
| DE | 102016012882 | A1 | | 6/2017 | |
| EP | 3626412 | B1 | | 3/2020 | |
| GB | 2529230 | A | | 3/2020 | |
| JP | 2006153474 | A | | 6/2006 | |
| KR | 20150019101 | A | | 2/2015 | |
| KR | 20150019127 | A | | 2/2015 | |
| KR | 20190031898 | A | | 10/2019 | |
| WO | 2007088045 | A1 | | 8/2007 | |
| WO | WO-2017156581 | A1 | * | 9/2017 | ........... A47K 17/022 |
| WO | 2018093417 | A1 | | 5/2018 | |
| WO | 2022177608 | A1 | | 8/2022 | |

OTHER PUBLICATIONS

PCBWay, "PCB Protection: Potting or Conformal Coating? | PCB Knowledge," PCBWay Blog, Oct. 23, 2023, 3 pages. URL: https://www.pcbway.com/blog/PCB_Basic_Information/PCB_Protection_Potting_or_Conformal_Coating_PCB_Knowledge_fee92383.html.

Pros Technology, "Potting—The Ultimate Protective Layer for Electronics," published on Youtube Mar. 2, 2024, URL: https://www.youtube.com/watch?v =-OPIVNkF63Erch 2024, captured with Page Vault May 5, 2026, 12 pages.

* cited by examiner

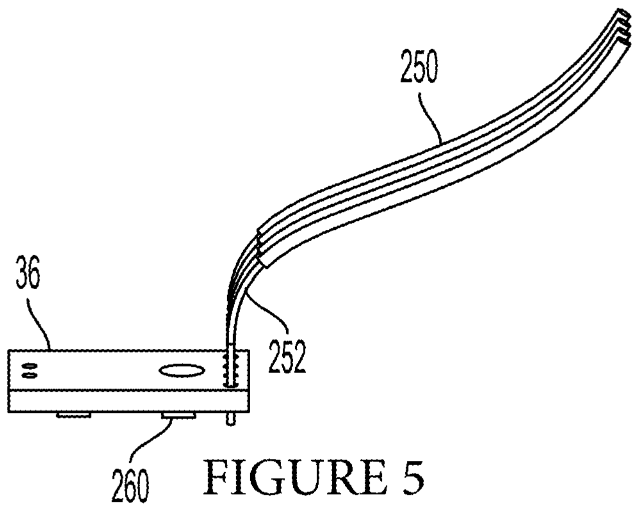
FIGURE 5
FIGURE 6A
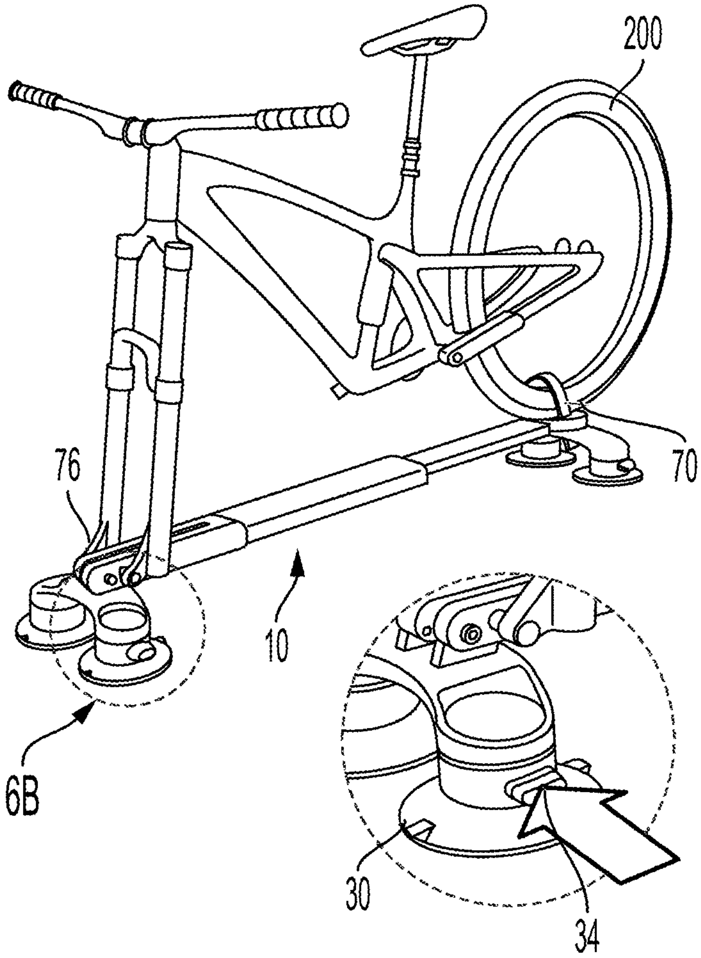
FIGURE 6B

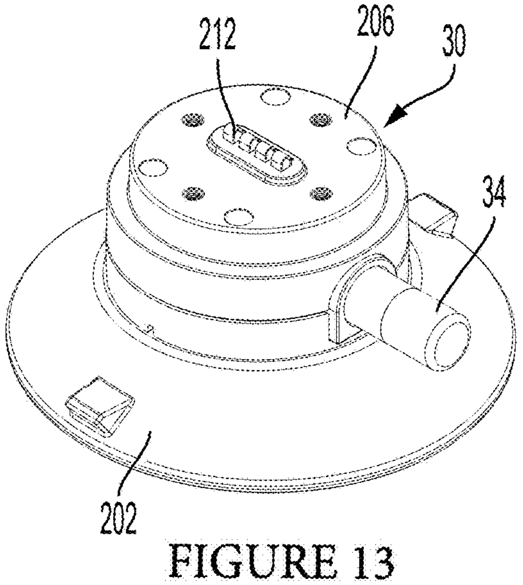
FIGURE 13
| Hours Pressurized | Potted Setup (new) | Plastic Cover (old) |
|---|---|---|
| 0 | 124 | 125 |
| 0.32 | 155 | 182 |
| 0.98 | 167 | 243 |
| 1.37 | 173 | 278 |
| 1.75 | 177 | 310 |
| 2.02 | 180 | 332 |
| 2.55 | 185 | 373 |
| 3.30 | 192 | 427 |
| 3.95 | 197 | 469 |
| 4.42 | 200 | 502 |
| 5.40 | 206 | 564 |
| 5.88 | 209 | 590 |
| 7.47 | 216 | 651 |
| 71.17 | 339 | 860 |
FIGURE 14
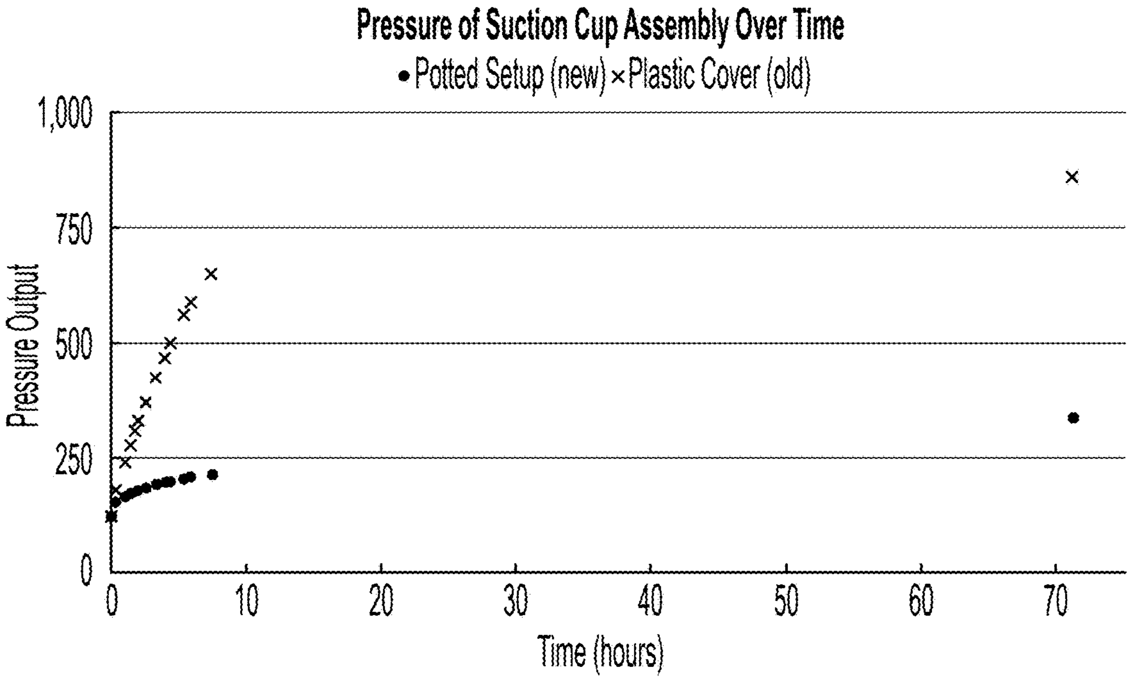
FIGURE 15

| Hours Pressurized | Potted Setup (new) | Plastic Cover (old) |
|---|---|---|
| 0 | 414 | 414 |
| 0.53 | 420 | 422 |
| 1.28 | 424 | 426 |
| 1.93 | 427 | 429 |
| 2.40 | 429 | 431 |
| 3.38 | 432 | 436 |
| 3.87 | 434 | 438 |
| 5.47 | 439 | 445 |
| 69.15 | 585 | 641 |

SUCTION CUP WITH POTTING MATERIAL

FIELD OF THE INVENTION

The invention relates, in part, to a suction cup made with a potting material to prevent pressure loss within the suction chamber.

BACKGROUND

There are a variety of known types of suction cup carrier devices for securing an accessory to a vehicle. For example, there are carrier devices which may have one or more racks designed to secure recreational equipment, such as bicycles, skis, snowboards and surfboards to a vehicle. These racks are typically attached to the roof, and/or the rear of the vehicle. These carrier devices have one or more suction cups to releasably secure the carrier device to a vehicle.

SUMMARY OF THE INVENTION

According to one aspect of the present disclosure, a suction cup configured to be selectively secured to an object is provided. The suction cup includes a suction cup housing defining a suction chamber therein, a vacuum pump configured to adjust the pressure within the suction chamber to selectively secure the suction cup to an object, and a pressure sensor positioned within the suction cup housing to detect suction chamber pressure information. The suction cup may also include at least one electrical line coupled to the pressure sensor to transmit suction chamber pressure information to a location outside of the suction cup, and a potting material positioned in at least a portion of the suction cup housing to prevent pressure loss within the suction chamber.

According to another aspect of the present disclosure, a method of assembling a suction cup configured to be selectively secured to an object is provided. The method includes providing a suction cup housing defining a suction chamber therein, placing a vacuum pump in the suction cup housing, where the vacuum pump is configured to adjust the pressure within the suction chamber to selectively secure the suction cup to an object, and placing a pressure sensor in the suction cup housing. The method may further include coupling at least one electrical line to the pressure sensor to transmit suction chamber pressure information to a location outside of the suction cup, and adding a potting material over the pressure sensor to prevent pressure loss within the suction chamber.

BRIEF DESCRIPTION OF THE DRAWINGS

FIG. 5 is a perspective view of a printed circuit board and plurality of electrical lines according to one embodiment;

FIG. 6A illustrates one embodiment of a carrier device for securing a bicycle to a vehicle, where the carrier device includes at least one suction cup;

FIG. 6B illustrates a detailed view of the suction cup shown in FIG. 6A;

FIG. 13 is a perspective view of a suction cup according to one embodiment;

FIG. 14 is a table of data directed to the suction cup of the present disclosure compared to a conventional suction cup;

FIG. 15 is a graph which depicts the data shown in FIG. 14;

DETAILED DESCRIPTION

Figure 1:
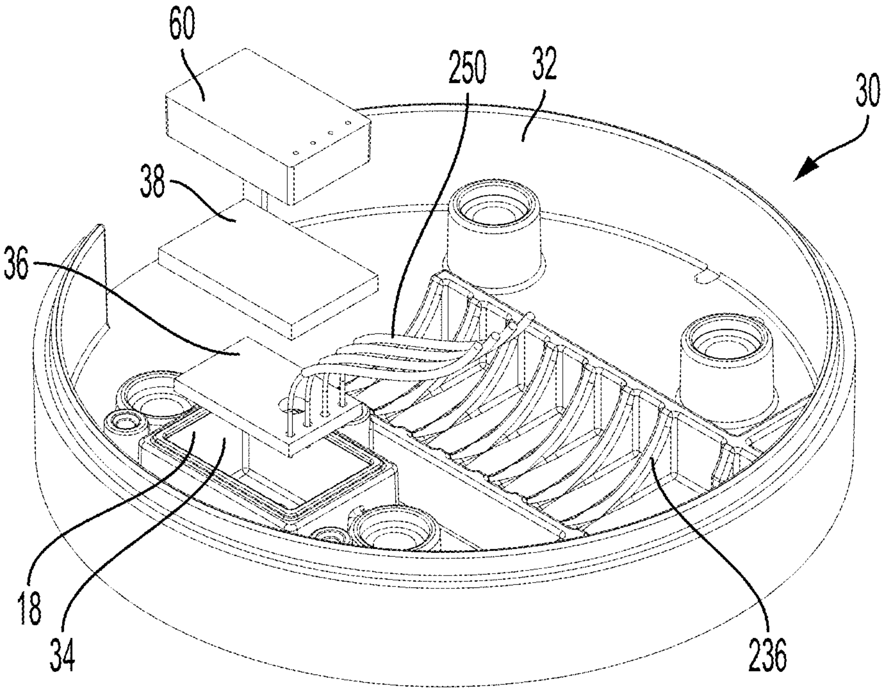
FIG. 1 is a perspective exploded view of a suction cup according to one embodiment shown.

The present disclosure is directed to a suction cup configured to be selectively secured to an object. As set forth in more detail below, the suction cup is made with a potting material in at least a portion of the suction cup to prevent pressure loss within the suction cup.

As set forth in more detail below, Applicant recognized that integrating a pressure sensor into the base of a suction cup enables the measurement of vacuum levels, allowing a user to monitor the suction cup's performance remotely. As outlined in detail below, the present disclosure is directed to a new approach which uses a potting material around the sensor to create an airtight seal, while maintaining an opening on the vacuum side of the sensor/printed circuit board to ensure the sensor is exposed to the pressure within the cup.

As described further below, "potting" is a process used to protect electrical components by covering or encapsulating them in a solid or semi-solid material. Typically, this process is used to ensure the components are guarded from environmental factors, such as moisture, dust, and vibration, while enhancing electrical insulation. Unlike the earlier known uses of a potting material, in the present disclosure, the potting material is used in a unique manner to create an airtight seal above the suction cup sensor/printed circuit board which may virtually eliminate air seepage around the printed circuit board and/or pressure sensor.

The Applicant recognized that there are a variety of applications where it may be desirable to secure a suction cup to an object, where the suction cup has a pressure sensor for monitoring the pressure within the suction cup. One such application for a suction cup is in a carrier device for securing an accessory to a vehicle. Various applications are contemplated in the present disclosure, but as set forth in more detail below, the carrier device itself (with its one or more suction cups) may be configured to selectively attach and detach from the vehicle. It should be appreciated that this disclosure builds upon Applicant's earlier U.S. Pat. No. 11,648,881 filed on Feb. 16, 2021, and U.S. Pat. No. 11,878,658 filed on Sep. 3, 2021, the contents of both applications are incorporated by reference in its entirety.

Aspects of the present disclosure are directed to a carrier device that includes one or more suction cups to selectively couple the carrier device to the vehicle. One or more vacuum pumps are configured to selectively adjust the pressure within the suction cup. One of ordinary skill in the art would recognize that adjusting the pressure within the suction cup creates a partial vacuum within the suction cup causing the suction cup to adhere to an adjacent surface. When the suction cup is used in a carrier device for securing an accessory to a vehicle, the adjacent surface is a surface of the vehicle. When desired, the pressure within the suction cup is adjusted to remove the partial vacuum to detach the suction cup (and carrier device) from the vehicle.

The suction cup may include safety features to enable the driver of the vehicle to monitor the pressure within the suction cup. Aspects of the present disclosure are directed to a suction cup that includes a sensor within the suction cup to detect pressure information. The suction cup may be configured to transmit the pressure information to a location outside of the suction cup. In one particular embodiment, wireless technology, such as Bluetooth technology, is incorporated into the carrier device such that the carrier device may be paired with a nearby electronic device, such as the driver's smart phone.

The Applicant recognized that it was critical to prevent pressure loss within the suction cup. In one embodiment, an electrical line is coupled to the sensor to transmit the pressure information to a location outside of the suction cup. Through experimentation, the inventors recognized that it was difficult to fully seal around the electrical line and that pressure loss could occur around the electrical line. As set forth in U.S. Pat. No. 11,878,658, the Applicant addressed this problem by providing an integrally molded housing formed around the electrical line to prevent pressure loss within the suction cup chamber.

The present disclosure builds upon this earlier disclosure and provides a different approach to preventing pressure loss within the suction cup. Aspects of the present disclosure are directed to the use of a potting material positioned in at least a portion of the suction cup to prevent pressure loss within the suction cup.

A potting material may be a liquid, solid, and/or gelatinous compound which is conventionally used to protect electronic components from environmental hazards and/or mechanical stress. For example, a potting material may be used to protect electrical components from moisture, dust, heat, vibration, and/or impact. Potting material has also been used to help protect against reverse engineering. In one embodiment of the present disclosure, a variety of types of potting materials may be used in the suction cup, including, but not limited to thermosetting plastics, silicone rubber gels, and/or epoxy resins. It should be appreciated that the specific type of potting material may be chosen based upon its desired properties. For example, an epoxy resin potting material may be a hard rigid component, a polyurethane potting material may be a more flexible and rubbery compound, whereas a silicone potting material may be a hard but somewhat flexible material. One of ordinary skill in the art will recognize that the potting material may include any pourable material that when placed into at least a portion of the suction cup, the material sets, cures, and/or changes in viscosity to form a seal around at least a portion of the suction chamber. In one embodiment, the potting material may be a glue-like substance.

In one particular embodiment, the potting material is an RTV (Room Temperature Vulcanizing) Silicone material, such as RTV 705. This product is a room temperature curing silicone rubber, which is non-toxic, tasteless, non-corrosive, no environmental pollution, high and low-temperature resistant, aging resistant, ozone resistant, ultraviolet resistant, chemical reagent resistant, has good electrical insulation performance, a long service life, a fast curing speed, and is especially suitable for assembly line production. It is transparent, insulating, moisture-proof and shockproof. In one embodiment, the potting material is extruded from an aluminum tube and it may cure by reacting with trace amounts of moisture in the air, and alcoholic substances (such as ethanol) are released. When the humidity is about 60%, the curing depth can reach about 3 mm at 24 hours in room temperature. The longer the potting material is placed at room temperature, the better the bonding effect of the potting material to the surrounding components of the suction cup. The components can be placed between 50° C. and 150° C. for 4-12 hours after the potting material is completely cured.

Figure 2:
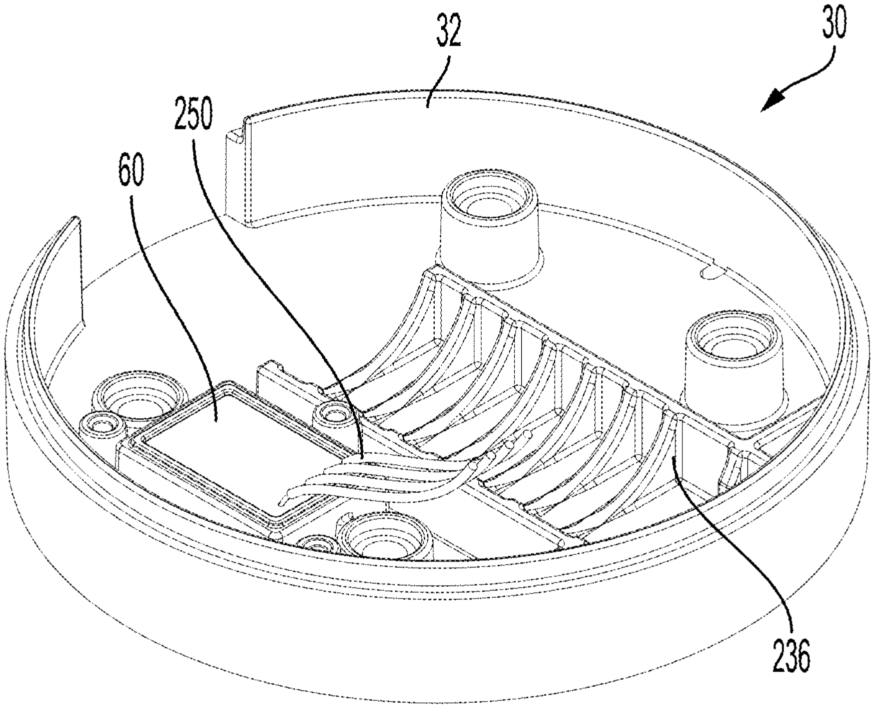
FIG. 2 is a perspective assembled view of the suction cup shown in FIG. 1.

Turning now to FIGS. 1-2, one embodiment of a suction cup 30 will now be more fully described. As shown, in the exploded assembly view in FIG. 1, the suction cup 30 includes a suction cup housing 32 defining a suction chamber 34 therein. In one embodiment, the suction cup 30 includes a pressure sensor 260 (see FIGS. 4A-4B, 5) positioned within the suction cup housing 32 to detect suction chamber pressure information. In the particular embodiment illustrated in FIG. 1, the pressure sensor 260 is positioned on the underside of a printed circuit board 36. As shown in FIG. 1, there is at least one electrical line 250 coupled to the pressure sensor 260 to transmit suction chamber pressure information to a location outside of the suction cup.

Figures 16, 17:
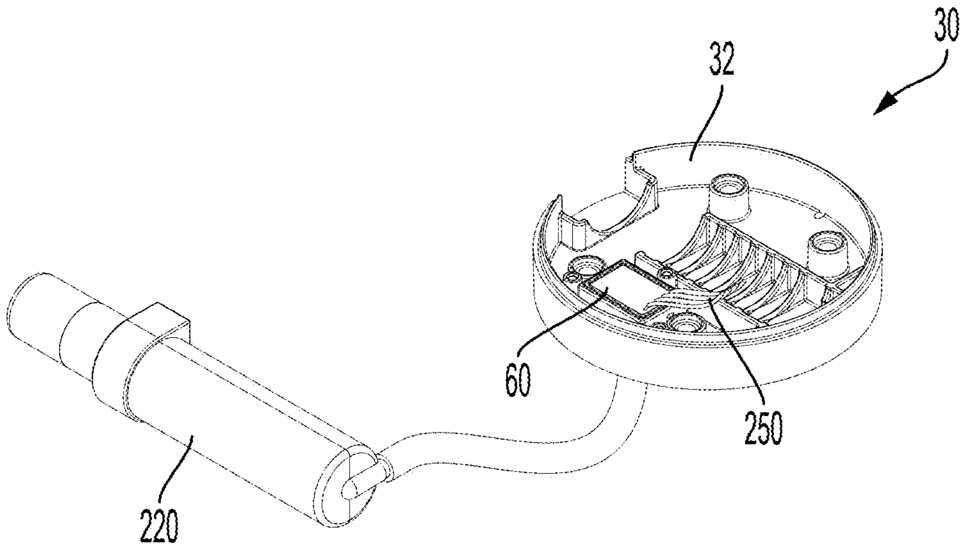
FIG. 16 is a perspective view of an experimental set-up to test the suction cup according to one embodiment.
FIG. 17 is a table of data directed to the suction cup of the present disclosure using the experimental set-up shown in FIG. 16, compared to a conventional suction cup.

In one embodiment, the suction cup 30 further includes a vacuum pump configured to adjust the pressure within the suction chamber 34 to selectively secure the suction cup to an object. Although the vacuum pump is not shown in FIGS. 1-2, it should be recognized that the suction cup housing 32 (also called a base cup 32) may include a plurality of ribs 236 to hold the vacuum pump, and in one embodiment, a representative vacuum pump housing 220 is shown in FIG. 16.

As shown in the exploded view of FIG. 1, the suction cup 30 further includes a potting material 60 positioned in at least a portion of the suction cup housing 32 to prevent pressure loss within the suction chamber 34. As set forth below, through experimentation, Applicant recognized that the addition of a potting material to the suction cup 30 may advantageously help to seal the suction chamber 34 (and may in particular seal the chamber 34 around the at least one electrical line 250) to prevent pressure loss. Various details regarding the potting material are discussed below.

As shown in the exploded view of FIG. 1, in one embodiment, a pad layer 38 is positioned on the printed circuit board 36, and the potting material is layered on top of the pad layer 38. It should be appreciated that in one embodiment, the pad layer 38 may help to protect the printed circuit board 36 and/or pressure sensor 260. It is also contemplated that the two-layer combination of the pad layer 38 and the potting material 60 may provide the desirable sealing around the electrical lines 250 necessary to prevent pressure loss within the suction chamber 34. Various materials are contemplated for the pad layer 38 including, but not limited to closed cell ethylene-vinyl acetate (EVA) foam. In one embodiment, the pad layer 38 includes an adhesive material to couple the pad layer 38 to the printed circuit board 36. In another embodiment, it is also contemplated that there is no pad layer 38 and the potting material 60 may, for example, be positioned directly on top of the printed circuit board 36 and/or the potting material 60 may be positioned directly on top of the pressure sensor 260, as the disclosure is not limited in this respect.

As shown in FIGS. 1-2, in one embodiment, the suction cup housing 32 comprises a recess/cavity 18 which defines at least a portion of the suction chamber 34, and the printed circuit board 36 and pressure sensor 260 are located within the recess 18. As shown in FIG. 1, in one embodiment, the recess 18 has a substantially rectangular shape and the recess 18 is formed in the suction cup housing 32 to have a rectangular shape that substantially aligns with the rectangular shape of the printed circuit board 36. Furthermore, as shown in FIG. 1, in one embodiment, the pad layer 38 also has a substantially similar rectangular shape and the potting material 60 is also formed to have a substantially similar rectangular shape. The potting material 60 may be a flowable material so that when it is added to the suction cup housing 32, it flows/forms to the shape of the surrounding recess 18. As shown in the partially assembled view of FIG. 2, after the pressure sensor 260, printed circuit board 36 and pad layer 38 are placed within the recess 18, the potting material 60 may be poured, injected or otherwise added to the suction cup 30. The potting material 60 may be a soft, liquid, solid, and/or gelatinous material which as it is poured into the recess 18, it will substantially form to the shape of the recess 18, and it will desirably spread out around the electrical lines 250 to effectively seal the top of the suction chamber 34 from undesired pressure loss. As shown in FIG. 2, in one embodiment, the potting material completely covers an upper surface of the printed circuit board 36. Furthermore, as shown in FIGS. 1-2, in one embodiment the at least one electrical line 250 includes a plurality of electrical lines 250 which are coupled to the pressure sensor to transmit pressure information.

Figure 3:
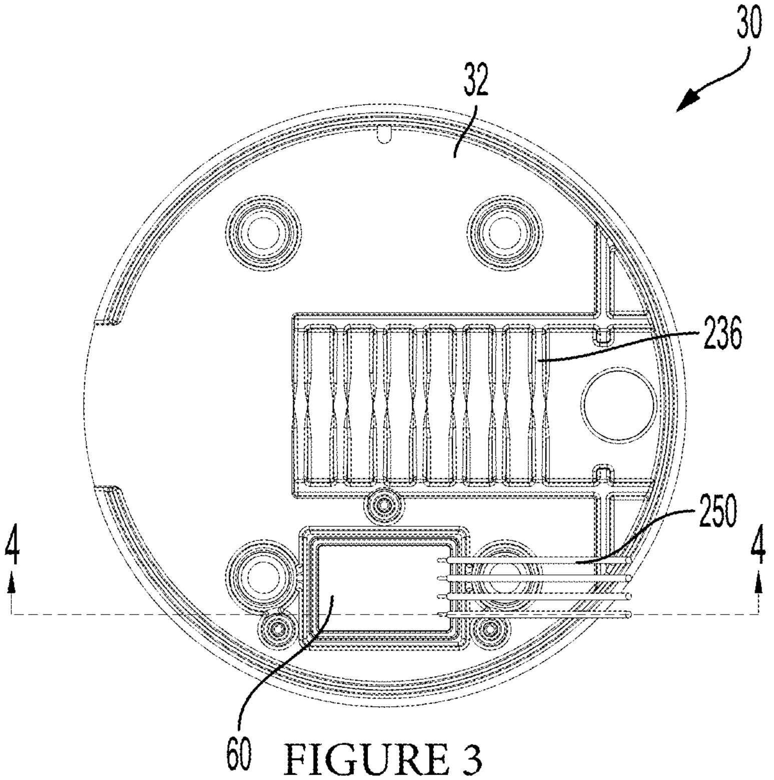
FIG. 3 is a top view of the assembled suction cup shown in FIG. 2.
Figure 4A:
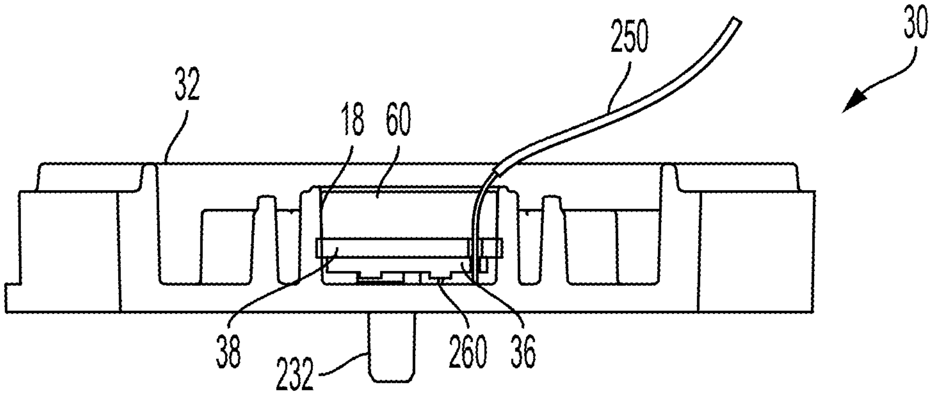
FIG. 4A is a cross-sectional view of the suction cup taken along line 4-4 shown in FIG. 3 according to one embodiment.
Figure 4B:
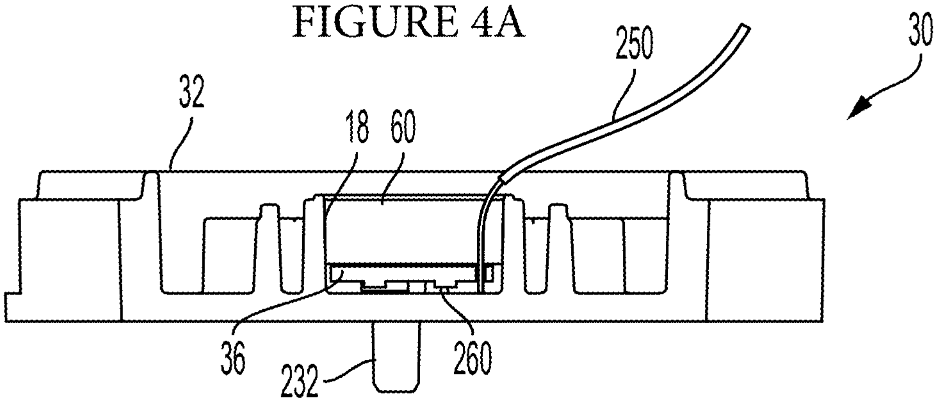
FIG. 4B is a cross-sectional view of the suction cup taken along line 4-4 shown in FIG. 3 according to another embodiment.

Turning now to FIGS. 3, 4A and 4B, additional representative views of the suction cup 30 are illustrated. For example, FIG. 3 is a top view of the suction cup 30 shown in FIGS. 1 and 2, with the potting material 60 added on top of the printed circuit board 36 within the recess 18. FIG. 4A illustrates a cross-sectional view taken along line 4-4 shown in FIG. 3, and illustrates the sub-assembly of the pad layer 38, printed circuit board 36 and pressure sensor 260 positioned in the recess 18 under the potting material 60, where the potting material 60 extends around the at least one electrical line 250 such that the electrical line 250 can transmit suction chamber pressure information to a location outside of the suction cup 30. Similarly, FIG. 4B illustrates a cross-sectional view taken along line 4-4 shown in FIG. 3, and illustrates the sub-assembly of the printed circuit board 36 and pressure sensor 260 positioned in the recess 18 under the potting material 60. Notably, in the embodiment shown in FIG. 4B, there is no pad layer 38 and thus the resulting layer of the potting material 60 may be thicker in comparison to the embodiment shown in FIG. 4A.

FIG. 5 illustrates a close up perspective view of a printed circuit board 36, pressure sensor 260 and at least one electrical line 250 according to one embodiment. As set forth in more detail below, in one embodiment, the insulation is striped from the end 252 of the electrical lines 250 before the lines/wires 250 are soldered to the circuit board 36.

As mentioned above, the above-described suction cup 30 may be used in combination with a carrier device for securing an accessory to a vehicle. In one embodiment, the carrier device may be configured to secure a variety of types of accessories to a vehicle, such as, but not limited to bicycles, skis, snowboards, surfboards, luggage, cameras, cargo boxes, etc. In one embodiment, the carrier device may be configured to secure at least one of a bicycle, outdoor equipment, solar panel and/or lighting system to a vehicle.

FIGS. 6-9 illustrate various embodiments of the suction cup 30 in combination with a carrier device 10. The suction cup may be mounted at each end of a support frame 20 and each suction cup may rotate independent of each other. One or more vacuum pumps are associated with the suction cups and are configured to selectively adjust the pressure within the suction cup to create a partial vacuum within the suction cup causing the cup to adhere to an adjacent vehicle surface. As shown in FIG. 6B, each suction cup 30 may include a button 34 on its side which, when pressed, activates the associated vacuum pump to cause the suction cup to be secured to the adjacent vehicle surface. In one embodiment, each vacuum pump is located within a vacuum pump housing 220 (see FIG. 16) positioned inside each suction cup 30. The present disclosure contemplates various types of known suction cup configurations. When desired, the pressure within the suction cups is adjusted to remove the partial vacuum to detach the suction cups (and carrier device) from the vehicle.

The carrier device 10 may include one or more attachment mounts for securing the accessory (such as a bicycle 200) to the carrier device 10. For example, as shown in FIG. 6A, the carrier device 10 may include a wheel strap 70 positioned at one end 24 of the support frame 20 which is configured to receive a bicycle wheel. As shown in FIG. 6A, the front bicycle wheel may be removed to secure the front of the bicycle to a fork mount 76 located on the end of the support frame 20. One of ordinary skill in the art would recognize that other types of attachment mounts may be desired for mounting other types of accessories to a vehicle. It should be appreciated that in another embodiment, the carrier device 10 may include various attachment mounts such as, but not limited to various straps, tethers, racks, bars, through axles, wheel clamps, or frame clamps.

Figure 7:
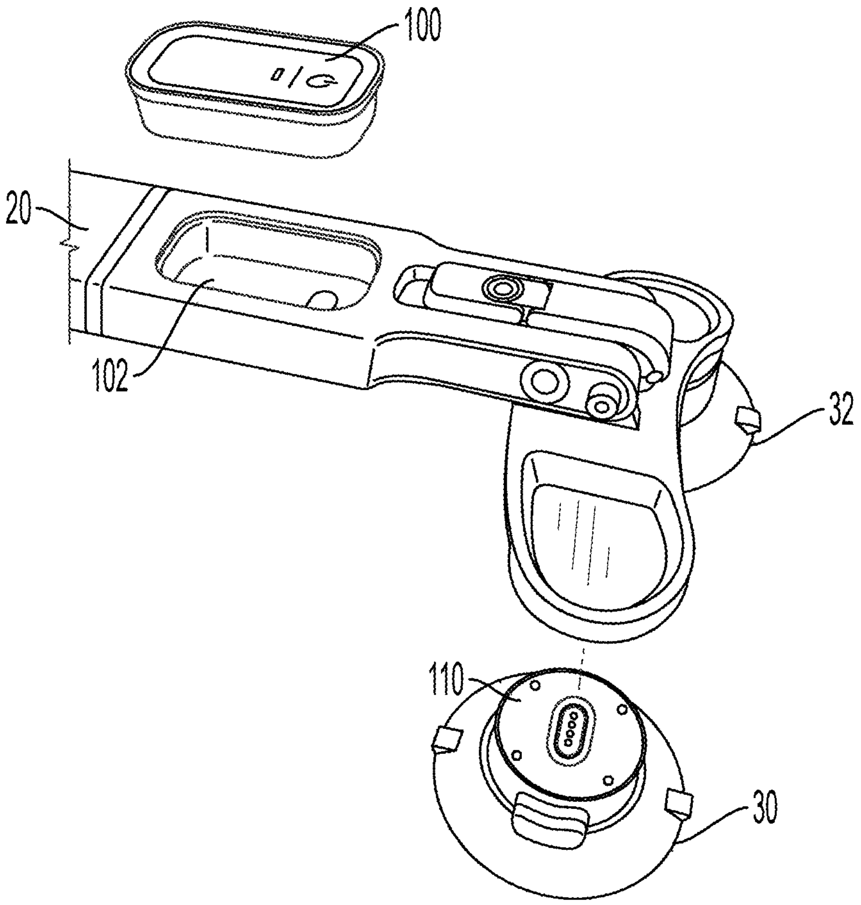
FIG. 7 illustrates one embodiment of a suction cup carrier device which includes a central hub.
Figure 8:
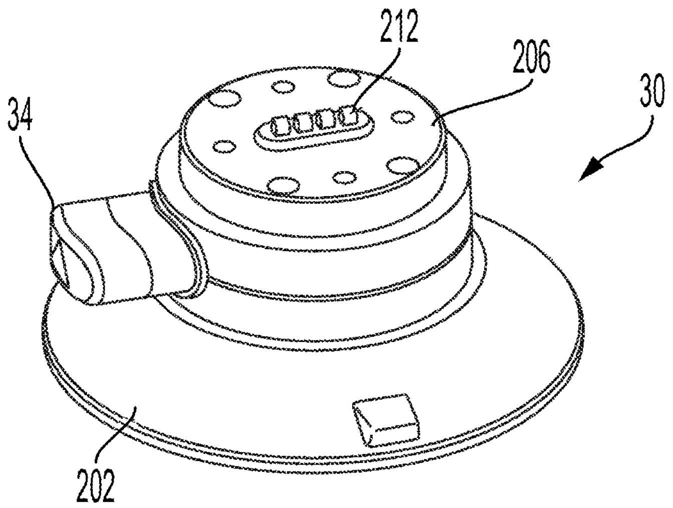
FIG. 8 is a perspective view of a suction cup according to one embodiment.
Figure 9:
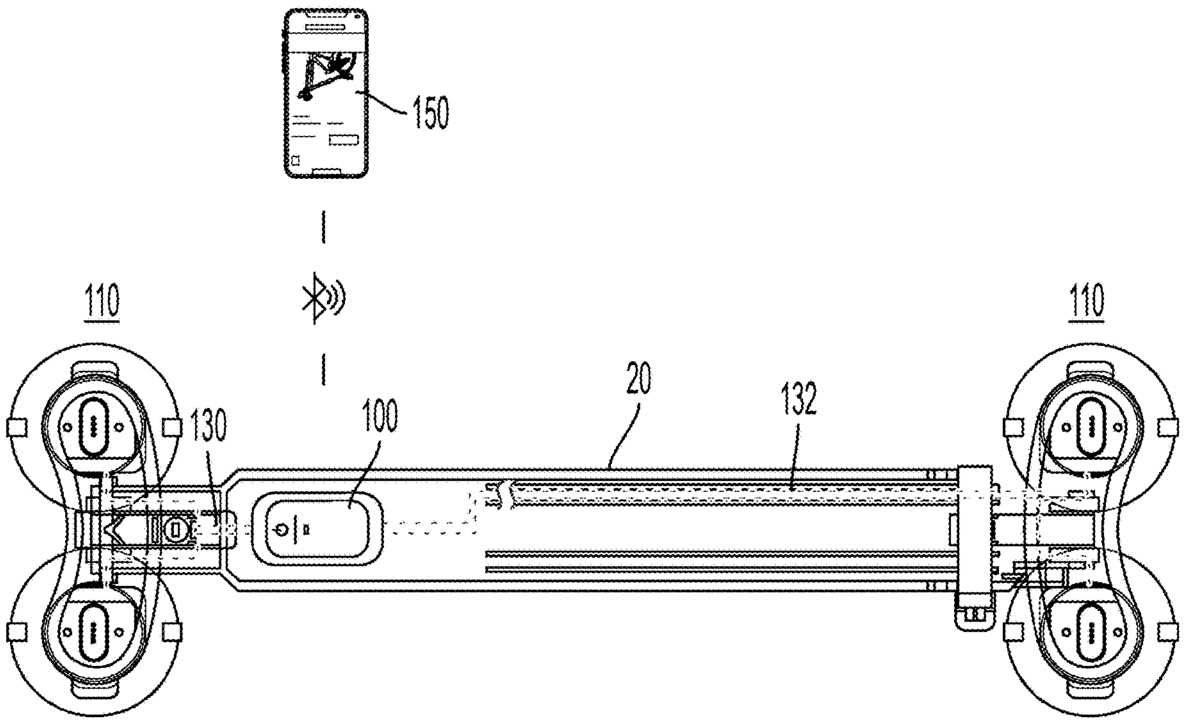
FIG. 9 is a top view of one embodiment of a carrier device which includes a central hub that interacts with a nearby electronic device, such as a smart phone.

Turning now to FIGS. 7-9, a high level overview of some of the electrical components of the carrier device 10 will now be discussed. Aspects of the present disclosure are directed to a suction cup carrier device with safety features which enable the driver of the vehicle to monitor the pressure within the suction cups 30. In one embodiment, it may be desirable for the pressure within each suction cup 30 to be approximately 700 psi or less, and in another embodiment, it may be desirable for the pressure within each suction cup 30 to be approximately 800 psi or less. The carrier device 10 may alert the driver if the pressure within any of the suction cups 30 is not at this threshold pressure.

As shown in the exploded view shown in FIG. 7, a suction sensor pod 110 may be associated with a first suction cup 30. The suction sensor pod 110 is configured to detect information about the pressure within the suction cups 30. In one embodiment, the suction sensor pod 110 includes the above-described pressure sensor 260 and potting material 60 assembly. As also shown in FIG. 7, the carrier device 10 may include a central hub 100 associated with the support frame 20. The central hub 100 may include a power source electrically coupled to the suction sensor pod 110, and a short range wireless interconnection module to selectively pair the suction sensor pod 110 to a nearby electronic device, for example via Bluetooth® technology, to transmit suction cup pressure information to a user. As shown in FIG. 9, in one embodiment, the nearby electronic device is a smart phone 150. In one embodiment, the central hub power source includes a battery which acts as the central power source for all of the suction cups 30. The central hub 100 may be housed within a recess 102 formed within the support frame 20. Wires 130, 132 may extend within the support frame to electrically connect the central hub 100 to each of the suction sensor pods 110.

As shown in FIG. 9, in one embodiment, the carrier device 10 employs Bluetooth® technology to pair the central hub 100 to a smart phone 150. The central hub 100 may include a power button, a pairing button (to connect the central hub 100 to the smart phone 150), and a status LED light to indicate power on/off and pairing status. The smart phone 150 may interact with the central hub 100 to provide suction cup pressure information. In one embodiment, the smart phone 150 may include an app configured to alert the driver (audible and/or visual alert) if the pressure within any of the suction cups 30 is not within the desired range. The app may also be configured to also provide continuous real-time pressure data for each of the suction cups 30.

FIG. 8 illustrate one embodiment of the suction cup 30 in greater detail. As mentioned above, the suction cup 30 has a suction cup housing 32 that defines a suction chamber 34. In one embodiment, the suction cup 30 also includes a suction cup bottom 202 and a suction cup top 206. The suction cup bottom 202 is configured to contact a surface of a vehicle, and in one embodiment for example, may be made of rubber. Other portions of the suction cup housing, such as the suction cup top 206 may be made of a more rigid plastic material. As discussed above, the button 34 actuates the vacuum pump in communication with the suction chamber to create a partial vacuum within the suction cup chamber and cause the cup to adhere to an adjacent vehicle surface. As shown in FIG. 8, one or more electrical contacts, such as puck contacts 212, may extend out of the suction cup top 206 and may be coupled to the above described wires 130, 132 to electrically connect the central hub 100 (see FIGS. 7, 9) to a pressure sensor 260 positioned inside of the suction cup 30.

The suction cup housing 32 (i.e. base cup) may be sandwiched between the suction cup top 206 and bottom 202. As shown in FIG. 4, in one embodiment, there is at least one port 232 within the suction chamber 34, wherein the port 232 is in fluid communication with a vacuum side of the suction cup 30. In one embodiment, the port 232 extends from the bottom of the cavity 18. It should be recognized that the suction cup top 206, the suction cup housing 32 (including cavity 18), and suction cup bottom 202 may together define the suction chamber 34 therein. In one embodiment, the port 232 may extend through the suction cup bottom 202 such that the underside of the suction cup bottom 202 also forms part of the suction chamber when the suction cup bottom 202 is in contact with a vehicle. One of ordinary skill in the art would appreciate that the port 232 enables the vacuum pump 220 to be in fluid communication with the rest of the suction chamber 34.

Figure 10:
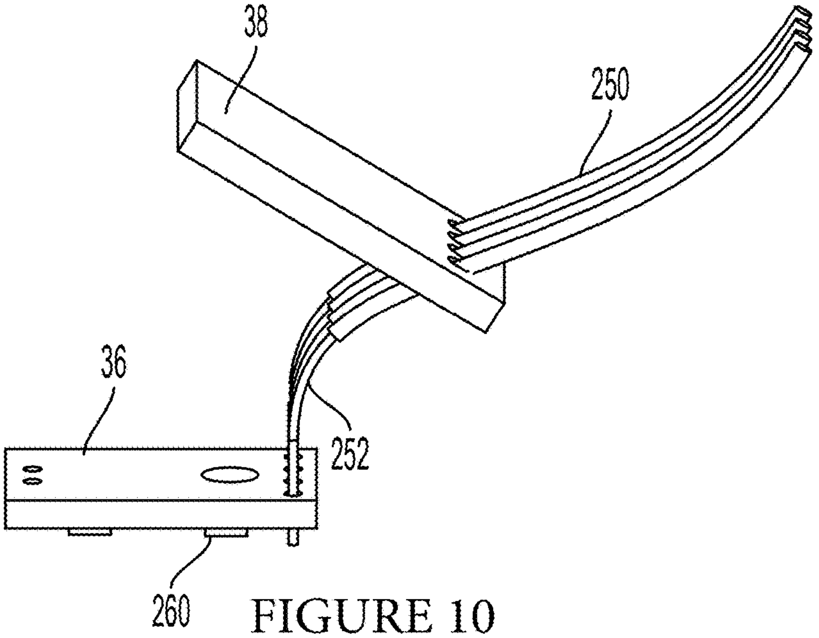
FIG. 10 is a perspective view which illustrates a method of assembling a suction cup which includes a printed circuit board, at least one electrical line, and a pad layer according to one embodiment.
Figure 11:
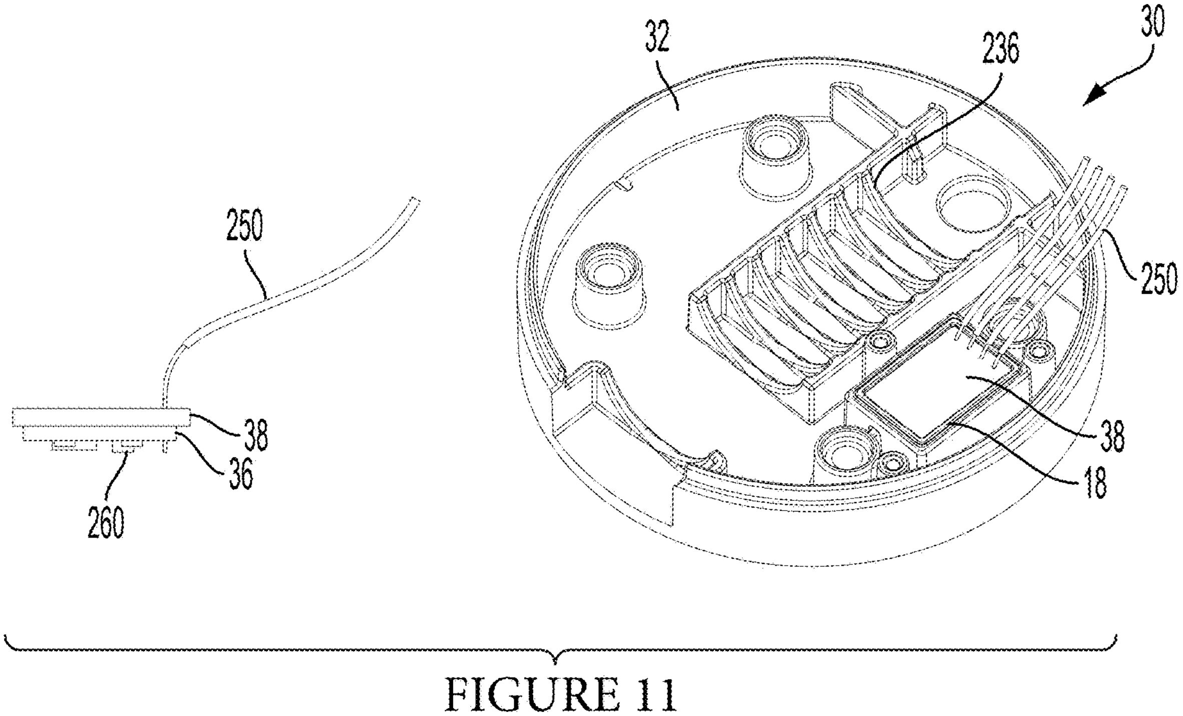
FIG. 11 illustrates a side view of the printed circuit board, electrical line, and pad layer assembly shown in FIG. 10, and an assembled view of the printed circuit board, electrical line, and pad layer assembly positioned within a suction cup housing.
Figure 12:
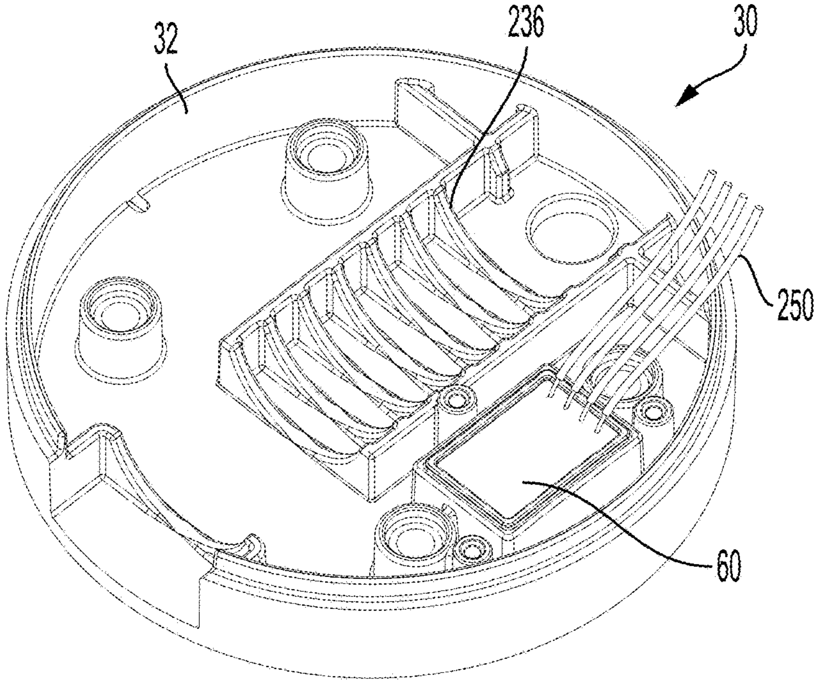
FIG. 12 illustrates an assembled view of the suction cup with a potting material positioned in at least a portion of the suction cup housing.

FIG. 10-12 illustrate one embodiment of a method of assembling a suction cup configured to be selectively secured to an object. As mentioned above, the potting material may help to reduce air from escaping around the printed circuit board/sensor and other electronic components, and the potting material may be configured to not affect the performance of the printed circuit board/sensor. As shown in FIG. 10, the insulation may first be stripped from the ends 252 of the wires 250, and the exposed wire may be soldered to the circuit board 36. As shown in FIG. 10, in one embodiment, a pad layer 38 is provided and it may have one or more holes which line up with the one or more electrical lines 250. As shown, during the assembly process, the electrical lines 250 may be thread through the hole(s) in the pad layer 38 to secure the pad layer 38 to the printed circuit board 36. Then, the printed circuit board 36/sensor 260 may be pressed into the appropriate cavity/recess 18 in the suction cup housing 32, with the sensor 260 facing downwards.

In one embodiment, the potting material is an off-the-shelf product, that may be a mixed as directed by the manufacturer's standards. In one embodiment, the potting material 60 is poured or injected onto the printed circuit board 36/sensor 260 and the electrical lines/wires 250 located in the chamber 18, ensuring that no wires are touching. In one embodiment, the potting material 60 completely covers the printed circuit board as shown in FIG. 12. Thereafter, it may be desirable to let the potting material 60 cure entirely before touching the surface or manipulating the wires. In one embodiment, the potting material 60 is a liquid, solid and/or gelatinous compound including at least one of a thermosetting plastic, a silicone rubber gel, and an epoxy resin.

As shown in FIGS. 10-12, the method may broadly include providing a suction cup housing 32 defining a suction chamber 34, and placing a vacuum pump (220 as shown in FIG. 16) in the suction cup housing 32, where the vacuum pump is configured to adjust the pressure within the suction chamber 34 to selectively secure the suction cup 30 to an object. As shown in FIG. 11, the method may include placing a pressure sensor 260 in the suction cup housing 32, and coupling at least one electrical line 250 to the pressure sensor 260 to transmit suction chamber pressure information to a location outside of the suction cup 30. As shown in FIG. 12, the method may also include adding a potting material 60 over the pressure sensor 260 to prevent pressure loss within the suction chamber 34.

As shown in FIGS. 10 and 11, the method may further include coupling a printed circuit board 36 to the pressure sensor 260, where the potting material 60 is positioned on top of the printed circuit board 260. As shown in the figures, the method may also include where the suction cup housing 32 includes a recess 18 which defines at least a portion of the suction chamber 34, and where the step of placing the pressure sensor 260 in the suction cup housing 32 includes placing the printed circuit board 36 and pressure sensor 260 within the recess, and where the step of adding the potting material 60 over the pressure sensor 260 includes pouring the potting material 60 into the recess 18. Finally, as shown in FIGS. 10-11, the method may include placing a pad layer 38 on the printed circuit board 36, and thereafter adding the potting material 60 over the pad layer 38 to prevent pressure loss within the suction chamber 34. As mentioned above, the pad layer may include one or more holes that correspond to the electrical lines, and the electrical line 250 may be thread through the hole(s) in the pad layer 38 to place the pad layer 38 on the printed circuit board 36. using the experimental set-up shown in FIG. 13-15 illustrate the experimental set-up and results directed to the suction cup 30 of the present disclosure compared to a conventional suction cup which does not have a potting material 60. In particular, FIG. 13 illustrates a perspective view of the suction cup 30 which was used to conduct these experiments, which has the above-described components. In this experiment, both suction cups were secured to a glass surface which would be analogous to the outside surface of a vehicle. FIG. 14 illustrates a table of pressure data comparing the suction cup 30 to a conventional suction cup over the course of over 71 hours. FIG. 15 is a graphical display of the data collected in FIG. 14. As shown, after an initial pressurization both the new suction cup 30 and the conventional suction cup reached a vacuum pressure of about 125 psi. However, after about 4 hours, the new suction cup 30 is still under 200 psi, whereas the conventional suction cup pressure is up to 500 psi. As shown in FIG. 15, the rate the pressure increases in the conventional suction cup is much greater than the rate the pressure increases in the new suction cup 30, demonstrating that the potting material 60 is effective at preventing pressure loss within the suction chamber.

Figure 18:
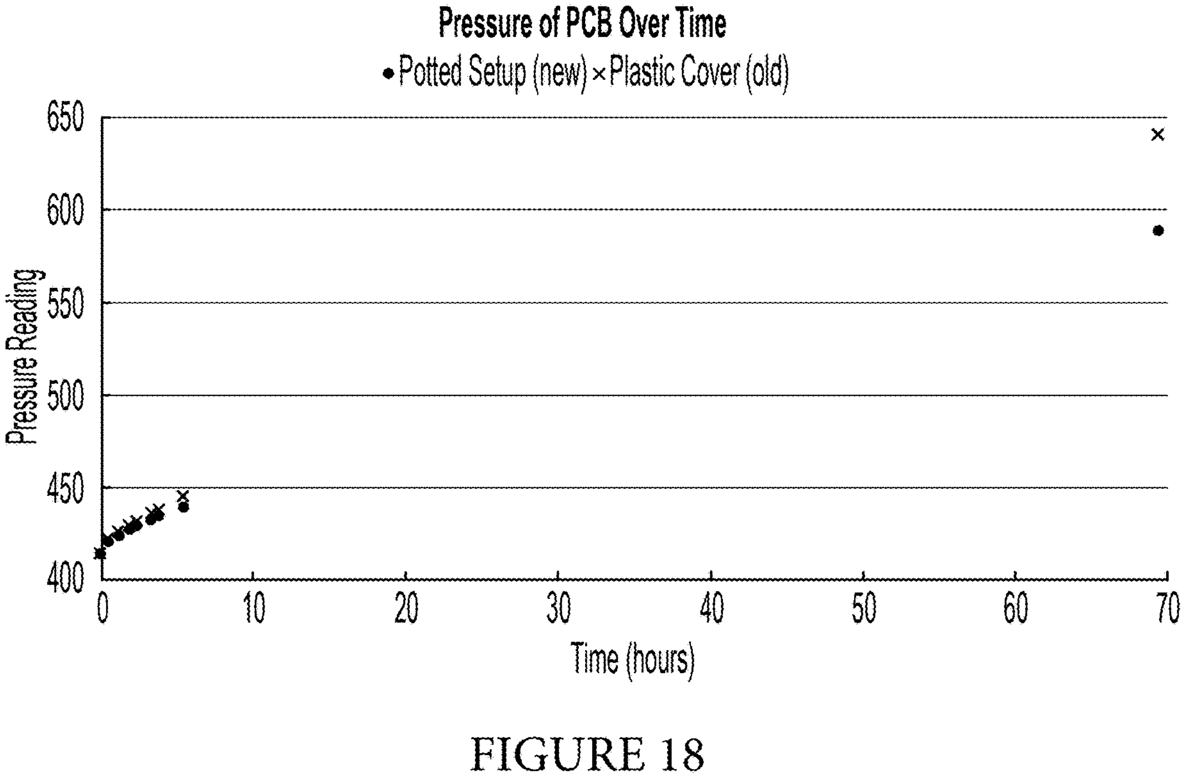
FIG. 18 is a graph which depicts the data shown in FIG. 17.

FIG. 16-18 illustrate another experimental set-up and results directed to the suction cup 30 of the present disclosure compared to a conventional suction cup which does not have a potting material 60. As shown in FIG. 16, instead of securing each suction cup 30 to a glass surface (similar to a vehicle surface), in this experimental set-up, the bottom of the suction chamber is coupled to a vacuum pump housing 220 and it is coupled via the above-described port 232 (see FIGS. 4A-4B). It should be recognized that under a normal configuration, the vacuum pump housing 220 is coupled to a top portion of the suction chamber 34, but in this experimental set-up, the vacuum pump housing 220 is used to test the effectiveness of the potting material 60. FIG. 17 illustrates a table of pressure data comparing the suction cup 30 to a conventional suction cup over the course of over 69 hours. FIG. 18 is a graphical display of the data collected in FIG. 17. As shown, after an initial pressurization both the new suction cup 30 and the conventional suction cup reached a vacuum pressure of about 414 psi. Initially, after about 5 hours, both the suction cup 30 with the potting material 60 and the conventional suction cup pressure are about 440 psi. However, after over 70 hours, the pressure of the suction cup 30 has only increased to 585 psi, where as the pressure in the conventional suction cup has increased to 641 psi, again demonstrating that the potting material 60 is effective at preventing pressure loss within the suction chamber.

As set forth above, the present disclosure is directed to a unique way of manufacturing a suction cup having a pressure sensor therein. As discussed above, this suction cup may have applications in the manufacturing of a carrier device for securing accessories to a vehicle. It is also contemplated that that the suction cup may be configured to be secured to other objects (besides a vehicle), including but not limited to various automotive, marine and/or aviation applications which incorporate the use of a suction cup with a pressure sensor for monitoring the pressure within the suction cup.

Although several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto; the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. A suction cup configured to be selectively secured to an object, the suction cup comprising:
- a suction cup housing defining a suction chamber therein;
- a vacuum pump configured to adjust the pressure within the suction chamber to selectively secure the suction cup to an object;
- a pressure sensor positioned within the suction cup housing to detect suction chamber pressure information;
- at least one electrical line coupled to the pressure sensor to transmit suction chamber pressure information to a location outside of the suction cup; and
- a potting material positioned in at least a portion of the suction cup housing to prevent pressure loss within the suction chamber.

2. The suction cup of claim 1, further comprising a printed circuit board coupled to the pressure sensor, wherein the potting material is positioned on top of the printed circuit board.

3. The suction cup of claim 2, wherein the suction cup housing comprises a recess which defines at least a portion of the suction chamber, and wherein the printed circuit board and pressure sensor are located within the recess.

4. The suction cup of claim 2, wherein the potting material completely covers an upper surface of the printed circuit board.

5. The suction cup of claim 2, further comprising a pad layer positioned on the printed circuit board, and wherein the potting material covers the pad layer.

6. The suction cup of claim 5, wherein the pad layer includes an adhesive material to couple the pad layer to the printed circuit board.

7. The suction cup of claim 1, wherein the at least one electrical line includes a plurality of electrical lines.

8. The suction cup of claim 1, wherein the potting material is a liquid, solid and/or gelatinous compound comprising at least one of a thermosetting plastic, a silicone rubber gel, and an epoxy resin.

9. The suction cup of claim 1, in combination with a carrier device for securing an accessory to a vehicle, wherein the suction cup is configured to be selectively secured to a vehicle.

10. The suction cup and carrier device combination of claim 9, wherein the carrier device is configured to secure at least one of a bicycle, outdoor equipment, a solar panel and/or a lighting system to a vehicle.

11. The suction cup and carrier device combination of claim 9, wherein the carrier device further includes a central hub, wherein the central hub includes:

a power source configured to be coupled to the printed circuit board; and a short range wireless interconnection module to selectively pair the pressure sensor to a nearby electronic device to transmit the suction chamber pressure information to a user.

12. The suction cup of claim 1, further comprising at least one port within the suction chamber, wherein the port is in fluid communication with a vacuum side of the suction cup.

13. A method of assembling a suction cup configured to be selectively secured to an object, the method comprising:

providing a suction cup housing defining a suction chamber therein;

placing a vacuum pump in the suction cup housing, wherein the vacuum pump is configured to adjust the pressure within the suction chamber to selectively secure the suction cup to an object;

placing a pressure sensor in the suction cup housing;

coupling at least one electrical line to the pressure sensor to transmit suction chamber pressure information to a location outside of the suction cup; and adding a potting material over the pressure sensor to prevent pressure loss within the suction chamber.

14. The method of claim 13, further comprising coupling a printed circuit board to the pressure sensor, and wherein the potting material is positioned on top of the printed circuit board.

15. The method of claim 14, wherein the suction cup housing includes a recess which defines at least a portion of the suction chamber, and wherein the step of placing the pressure sensor in the suction cup housing includes placing the printed circuit board and pressure sensor within the recess, and wherein the step of adding the potting material over the pressure sensor includes pouring the potting material into the recess.

16. The method of claim 13, further comprising:

placing a pad layer on the printed circuit board, and thereafter adding the potting material over the pad layer to prevent pressure loss within the suction chamber.

* * * * *